(12) United States Patent
Kohno et al.

(10) Patent No.: US 6,875,149 B2
(45) Date of Patent: Apr. 5, 2005

(54) AUTOMATIC TRANSMISSION

(75) Inventors: Tetsuya Kohno, Okazaki (JP); Toshiki Kanada, Anjou (JP); Hirofumi Onishi, Aichi-gun (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/620,699

(22) Filed: Jul. 17, 2003

(65) Prior Publication Data

US 2004/0023747 A1 Feb. 5, 2004

(30) Foreign Application Priority Data

Jul. 31, 2002 (JP) ........................................ 2002-224222

(51) Int. Cl.[7] ................................................. F16H 3/44
(52) U.S. Cl. ....................................................... 475/281
(58) Field of Search ................................. 475/281, 280

(56) References Cited

U.S. PATENT DOCUMENTS 5,577,976 A * 11/1996 Haka ........................... 475/280

FOREIGN PATENT DOCUMENTS

| JP | 04119244 A | 4/1992 |
|----|------------|--------|
| JP | 08105496 A | 4/1996 |
| JP | 2000266138 A | 9/2000 |
| JP | 2001082555 A | 3/2001 |
| WO | WO 01/04513 A1 | 1/2001 |
| WO | WO 01/27496 A1 | 4/2001 |

* cited by examiner

*Primary Examiner*—Dirk Wright
(74) *Attorney, Agent, or Firm*—Oblon, Spivak, McClelland, Maier & Neustadt, P.C.

(57) ABSTRACT

An automatic transmission having seven gear speeds for forward driving is provided, in which a planetary gear P1 of a first planetary gear set 12 and an outer planetary gear P2out of a second planetary gear set 14 are integrally coupled, a first rotational element M1 is formed by a sun gear S1, a second rotational element M2 is formed by carriers CA1, CA2 coupled with each other, a third rotational element M3 is formed by a ring gear R2, a fourth rotational element is formed by a ring gear R1, and a fifth rotational element M5 is formed by a sun gear S2. The rotational elements M5, M3, M2 are connectable to an input shaft 16 via clutches C1, C2, C3, respectively, and the rotational elements M3, M2, M1 are connectable to a case 20 via brakes B1, B2, B3, respectively. The rotational element M4 is integrally coupled with an output gear 18.

7 Claims, 4 Drawing Sheets

|  | C1 | C2 | C3 | B1 | B2 | B3 | F1 | TRANSMISSION GEAR RATIO |
|---|---|---|---|---|---|---|---|---|
| 1st | ○ |  |  | (○) |  |  | ○ | 3.478 |
| 2nd | ○ |  |  |  | ○ |  |  | 2.000 |
| 3rd | ○ |  |  |  |  | ○ |  | 1.320 |
| 4th | ○ | ○ |  |  |  |  |  | 1.000 |
| 5th |  | ○ |  |  |  | ○ |  | 0.871 |
| 6th |  |  | ○ |  |  | ○ |  | 0.680 |
| 7th |  | ○ |  |  | ○ |  |  | 0.597 |
| Rev |  |  | ○ | ○ |  |  |  | 1.478 |

|     | C1 | C2 | C3 | B1  | B2 | B3 | F1 | TRANSMISSION GEAR RATIO |
|-----|----|----|----|-----|----|----|----|-------------------------|
| 1st | O  |    |    | (O) |    |    | O  | 3.000                   |
| 2nd | O  |    |    |     | O  |    |    | 1.667                   |
| 3rd | O  |    |    |     |    | O  |    | 1.400                   |
| 4th | O  | O  |    |     |    |    |    | 1.000                   |
| 5th |    | O  |    |     |    | O  |    | 0.800                   |
| 6th |    | O  |    |     | O  |    |    | 0.667                   |
| 7th |    |    | O  |     |    | O  |    | 0.400                   |
| Rev |    |    | O  | O   |    |    |    | 2.000                   |

AUTOMATIC TRANSMISSION

INCORPORATION BY REFERENCE

The disclosure of Japanese Patent Application No. 2002-224222 filed on Jul. 31, 2002, including the specification, drawings and abstract is incorporated herein by reference in its entirety.

BACKGROUND OF THE INVENTION

1. Field of Invention

The invention is directed to an automatic transmission constituted by two planetary gear sets so as to permit a multi-speed transmission among a plurality of gear speeds.

2. Description of Related Art

There are known many automatic transmissions for vehicles which are constituted by a plurality of planetary gear sets, clutches, and brakes. Of such automatic transmissions, Japanese Laid-opened Application No. 2000-266138 discloses a vehicular automatic transmission constituted by four planetary gear sets and having seven gear speeds for forward driving. However, using four planetary gear sets, this transmission involves drawbacks of increased length in its axial direction, diminished installability to vehicles, increased weight, and increased cost.

SUMMARY OF THE INVENTION

In view of the above situation, the invention has been made to provide an automatic transmission constituted by two planetary gear sets so as to permit a multi-speed transmission among seven gear speeds.

To achieve this object, an automatic transmission according to a first aspect of the invention includes a first planetary gear set, a second planetary gear set, a first clutch, a second clutch, a first brake, a second brake, a third brake, a non-rotatable portion, an input portion for inputting rotations, and an output portion for outputting rotations transmitted from the input portion. A planetary gear of the first planetary gear set and a planetary gear of the second planetary gear set are integrally coupled with each other such that the planetary gears rotate about a common axis. A carrier of the first planetary gear set and a carrier of the second planetary gear set are integrally coupled with each other. A sun gear and a ring gear of the first planetary gear set, a sun gear and a ring gear of the second planetary gear set, and the coupled carriers of the first and second planetary gear sets form a first rotational element, a second rotational element, a third rotational element, a fourth rotational element, and a fifth rotational element, which are indicated, sequentially from an end toward another end, in an alignment graph for indicating rotation speeds of rotational elements by straight lines. The first rotational element is selectively connectable to the non-rotatable portion via the third brake so that rotation of the first rotational element is stopped by engaging the third brake. The second rotational element is selectively connectable to the non-rotatable portion via the second brake so that rotation of the second rotational element is stopped by engaging the second brake. The third rotational element is selectively connectable to the input portion via the second clutch and is selectively connectable to the non-rotatable portion via the first brake so that rotation of the third rotational element is stopped by engaging the first brake. The fourth rotational element is coupled with the output portion. The fifth rotational element is selectively connectable to the input portion via the first clutch. In the automatic transmission constructed as described above, the first clutch and the first brake are engaged to establish a first gear speed having a largest transmission gear ratio. The first clutch and the second brake are engaged to establish a second gear speed having a transmission gear ratio smaller than the transmission gear ratio of the first gear speed. The first clutch and the third brake are engaged to establish a third gear speed having a transmission gear ratio smaller than the transmission gear ratio of the second gear speed. The first clutch and the second clutch are engaged to establish a fourth gear speed having a transmission gear ratio smaller than the transmission gear ratio of the third gear speed. The second clutch and the third brake are engaged to establish a fifth gear speed having a transmission gear ratio smaller than the transmission gear ratio of the fourth gear speed.

An automatic transmission according to a second aspect of the invention includes a first planetary gear set, a second planetary gear set, a first clutch, a second clutch, a third clutch, a first brake, a second brake, a third brake, a non-rotatable portion, an input portion for inputting rotations, and an output portion for outputting rotations transmitted from the input portion. A planetary gear of the first planetary gear set and a planetary gear of the second planetary gear set are integrally coupled with each other such that the planetary gears rotate about a common axis. A carrier of the first planetary gear set and a carrier of the second planetary gear set are integrally coupled with each other. A sun gear and a ring gear of the first planetary gear set, a sun gear and a ring gear of the second planetary gear set, and the coupled carriers of the first and second planetary gear sets form a first rotational element, a second rotational element, a third rotational element, a fourth rotational element, and a fifth rotational element, which are indicated, sequentially from an end toward another end, in an alignment graph for indicating rotation speeds of rotational elements by straight lines. The first rotational element is selectively connectable to the non-rotatable portion via the third brake so that rotation of the first rotational element is stopped by engaging the third brake. The second rotational element is selectively connectable to the non-rotatable portion via the second brake so that rotation of the second rotational element is stopped by engaging the second brake. The third rotational element is selectively connectable to the input portion via the second clutch and is selectively connectable to the non-rotatable portion via the first brake so that rotation of the third rotational element is stopped by engaging the first brake. The fourth rotational element is coupled with the output portion. The fifth rotational element is selectively connectable to the input portion via the first clutch. In the automatic transmission constructed as described above, the first clutch and the first brake are engaged to establish a first gear speed having a largest transmission gear ratio. The first clutch and the second brake are engaged to establish a second gear speed having a transmission gear ratio smaller than the transmission gear ratio of the first gear speed. The first clutch and the third brake are engaged to establish a third gear speed having a transmission gear ratio smaller than the transmission gear ratio of the second gear speed. Selected two of the first clutch, the second clutch, and the third clutch are engaged to establish a fourth gear speed having a transmission gear ratio smaller than the transmission gear ratio of the third gear speed. The second clutch and the third brake are engaged to establish a fifth gear speed having a transmission gear ratio smaller than the transmission gear ratio of the fourth gear speed.

In the automatic transmissions according to the first and second aspects of the invention, it is preferable that the first planetary gear set be of a single-pinion type, the second planetary gear set be of a double-pinion type, the planetary gear of the first planetary gear set and an outer planetary gear of the second planetary gear set be integrally coupled with each other, the first rotational element be formed by the sun gear of the first planetary gear set, the second rotational element be formed by the carrier of the first planetary gear set and the carrier of the second planetary gear set, the third rotational element be formed by the ring gear of the second planetary gear set, the fourth rotational element be formed by the ring gear of the first planetary gear set, and the fifth rotational element be formed by the sun gear of the second planetary gear set.

Next, an automatic transmission according to a third aspect of the invention includes a first planetary gear set, a second planetary gear set, a first clutch, a second clutch, a third clutch, a first brake, a second brake, a third brake, a non-rotatable portion, an input portion for inputting rotations, and an output portion for outputting rotations transmitted from the input portion. A planetary gear of the first planetary gear set and a planetary gear of the second planetary gear set are integrally coupled with each other such that the planetary gears rotate about a common axis. A carrier of the first planetary gear set and a carrier of the second planetary gear set are integrally coupled with each other. A sun gear and a ring gear of the first planetary gear set, a sun gear and a ring gear of the second planetary gear set, and the coupled carriers of the first and second planetary gear sets form a first rotational element, a second rotational element, a third rotational element, a fourth rotational element, and a fifth rotational element, which are indicated, sequentially from an end toward another end, in an alignment graph for indicating rotation speeds of rotational elements by straight lines. The first rotational element is selectively connectable to the non-rotatable portion via the third brake so that rotation of the first rotational element is stopped by engaging the third brake. The second rotational element is selectively connectable to the input portion via the third clutch and is selectively connectable to the non-rotatable portion via the second brake so that rotation of the second rotational element is stopped by engaging the second brake. The third rotational element is selectively connectable to the input portion via the second clutch and is selectively connectable to the non-rotatable portion via the first brake so that rotation of the third rotational element is stopped by engaging the first brake. The fourth rotational element is coupled with the output portion. The fifth rotational element is selectively connectable to the input portion via the first clutch. In the automatic transmission constructed as described above, the first clutch and the first brake are engaged to establish a first gear speed having a largest transmission gear ratio. The first clutch and the second brake are engaged to establish a second gear speed having a transmission gear ratio smaller than the transmission gear ratio of the first gear speed. The first clutch and the third brake are engaged to establish a third gear speed having a transmission gear ratio smaller than the transmission gear ratio of the second gear speed. Selected two of the first clutch, the second clutch, and the third clutch are engaged to establish a fourth gear speed having a transmission gear ratio smaller than the transmission gear ratio of the third gear speed. The second clutch and the third brake are engaged to establish a fifth gear speed having a transmission gear ratio smaller than the transmission gear ratio of the fourth gear speed. The second clutch and the second brake are engaged to establish a sixth gear speed having a transmission gear ratio smaller than the transmission gear ratio of the fifth gear speed. The third clutch and the third brake are engaged to establish a seventh gear speed having a transmission gear ratio smaller than the transmission gear ratio of the sixth gear speed.

In the automatic transmissions according to the first and third aspects of the invention, it is preferable that the first planetary gear set be of a single-pinion type, the second planetary gear set be of a double-pinion type, the planetary gear of the first planetary gear set and an inner planetary gear of the second planetary gear set be integrally coupled with each other, the first rotational element be formed by the ring gear of the first planetary gear set, the second rotational element be formed by the carrier of the first planetary gear set and the carrier of the second planetary gear set, the third rotational element be formed by the ring gear of the second planetary gear set, the fourth rotational element be formed by the sun gear of the first planetary gear set, and the fifth rotational element be formed by the sun gear of the second planetary gear set.

In the automatic transmissions described above, the planetary gear of the first planetary gear set and the planetary gear of the second planetary gear set are integrally coupled with each other so that they rotate about a common axis, and five rotational elements are formed by the common carrier formed by the coupled two carriers, the two sun gears, and the two ring gears, respectively. Incorporating the two planetary gear sets thus configured, the automatic transmission according to the first aspect of the invention provides five gear speeds using two clutches and three brakes, and each automatic transmission according to the second or third aspect of the invention provides seven gear speeds using three clutches and three brakes. Thus, as compared to the conventional automatic transmissions constituted by four planetary gear sets, the automatic transmissions of the invention can be constructed to be much shorter in their axial lengths, and thereby to be light in weight, which provides advantages of improved installability to vehicles, reduced number of parts, and reduced cost.

With the first to fifth rotational elements respectively defined by the corresponding rotational elements as described above, even if each planetary gear set is relatively small in size (i.e., diameter), it is possible to achieve a relatively large total transmission gear ratio width of 5 or more by properly setting the gear ratio (number of teeth of sun gear/number of teeth of ring gear) of each planetary gear set.

Each automatic transmission according to the invention may preferably be embodied as an automatic transmission for vehicles, where rotation is input to the automatic transmission via a hydraulically driven friction engagement device, such as a torque converter, and the rotation speed changed is output from an output portion, such as an output gear and an output shaft, and is transmitted via a differential gear device to right and left wheels. For example, the input portion is formed by a turbine shaft of the torque converter.

Each automatic transmission according to the invention may either be transversely placed in FF (Front engine-Front drive) vehicles where the axis of the automatic transmission extends in the width direction of the vehicle, or be longitudinally placed in FR (Front engine-Rear drive) vehicles where the axis of the automatic transmission extends in the longitudinal direction of the vehicle.

Each automatic transmission of the invention may be of a type that is automatically shifted in accordance with operation conditions, such as accelerator operation amount and vehicle speed, or may be of a type that is manually shifted by operators through the use of corresponding switches (up-down switches). The automatic transmission according to the second or third aspect of the invention can be shifted among seven gear speeds for forward driving. However, more than seven gear speeds can be achieved by configuring in series the automatic transmission and a 2-speed sub-transmission having high and low gear speeds. Also, by engaging the third clutch and the first brake, a reverse speed gear for reverse driving is achieved. Meanwhile, the automatic transmission according to the first aspect of the invention has five speeds for forward driving. However, by adding a third clutch, or the like, sixth and seventh gear speeds each having a transmission gear ratio smaller than the fifth gear speed can be achieved, whereby the automatic transmission can be constructed as a 7-speed automatic transmission, like those according to the second and third aspects of the invention.

While the first to third clutches and the first to third brakes are preferably formed by hydraulically driven friction engagement devices of a single-plate or multi-plate type which are friction-engaged by hydraulic cylinders, they may instead be formed by engagement devices of other types, such as electromagnetically-driven engagement devices. For facilitating the shift control of the transmission, a one-way clutch(s) may be provided in parallel with the clutches and brakes. For example, if a one-way clutch is provided in parallel with the first brake, the first gear speed can be established by engaging the first clutch only, and the second gear speed can be established by subsequently engaging the second brake. If engine brake is not needed at the first gear speed, the first brake may be replaced by a one-way clutch. In this case, the one-way clutch provides the same effect of stopping rotations as the first brake. Other than these examples, various arrangements and constructions can be adopted, such as providing a one-way clutch and a brake, connected in series with each other, in parallel with the second or third brake.

By the way, a gear speed corresponding to the transmission gear ratio of 1, which is often the fourth gear speed, can be established by rotating the first and second planetary gear sets together as one unit. In case of the automatic transmissions according to the second and third aspects of the invention, each including the first to third clutches, the first and second planetary gear sets can be rotated together by engaging any two of the three clutches, or by engaging all the three clutches.

Based on the constructions described above, for example, an eighth or further gear speed can be achieved by providing a brake for stopping the rotation of the fifth rotational element, a clutch for connecting the first rotational element to the input portion, or a clutch for connecting the third rotational element to the output portion and connecting the fourth rotational element to the input portion. Thus, various arrangements and constructions are possible.

In the automatic transmissions according to the first to third aspects of the invention, as aforementioned, the first planetary gear set may be of a single-pinion type and the second planetary gear set may be of a double-pinion type. Optionally, for example, the first and second planetary gear sets may both be of a single-pinion type or double-pinion type. Thus, various arrangements and constructions are possible.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figures 1A, 1B:
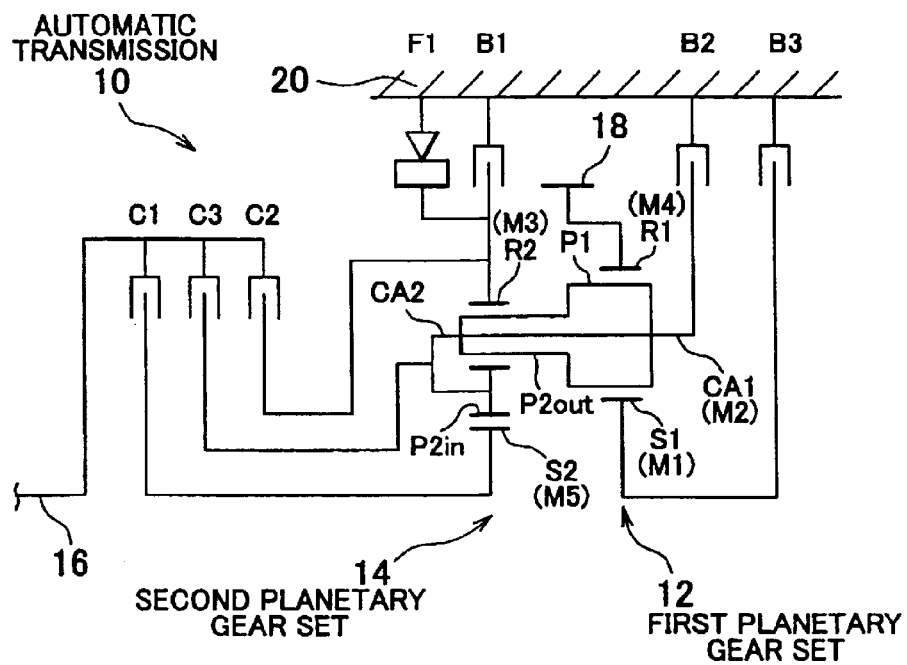
FIG. 1A is a skeleton diagram showing a construction of an automatic transmission for vehicles according to a first embodiment of the invention.
FIG. 1B is an operation table indicating relationships between actuation of engagement devices and gear speeds to be established, and transmission gear ratios achieved at the respective gear speeds.

Hereinafter, a first embodiment of the invention will be described in detail with reference to the accompanying drawings. FIG. 1A is a skeleton diagram showing a construction of an automatic transmission 10 according to the first embodiment of the invention. FIG. 1B is an operation table indicating relationships between actuation of engagement devices and gear speeds to be established, and transmission gear ratios achieved at the respective gear speeds. The automatic transmission 10 is of a type which is transversely disposed in FF vehicles, and the like. The automatic transmission 10 includes, as its main components, two planetary gear sets, that is, a first planetary gear set 12 and a second planetary gear set 14, and is operable to change the rotation speed of an input shaft 16 and output the changed rotation speed via an output gear 18. In the embodiment, rotations are transmitted to the automatic transmission 10 from a crankshaft of an internal combustion engine (will simply be referred to as "engine") via a torque converter not shown in the figures, and the input shaft 16, which corresponds to "an input portion" in the invention, is formed by a turbine shaft of the torque converter. On the other hand, the output gear 18 corresponds to "an output portion" in the invention, which drives the right and left wheels to rotate via a differential gear device, etc. The transmission 10 is constructed symmetrically about an axis thereof. In the skeleton diagram of FIG. 1, therefore, a lower portion of the transmission 10 is not shown.

The first planetary gear set 12 is of a single-pinion type, including a sun gear S1, a ring gear R1, a carrier CA1, and planetary gears P1 each rotatably supported on the carrier CA1 and mesh-connected to the sun gear S1 and the ring gear R1. The second planetary gear set 14 is of a double-pinion type, including a sun gear S2, a ring gear R2, a carrier CA2, inner planetary gears P2in each rotatably supported on the carrier CA2 and mesh-connected to the sun gear S2, and outer planetary gears P2out each rotatably supported on the carrier CA2 and mesh-connected to a corresponding one of the inner planetary gears P2in and the ring gear R2. Each planetary gear P1 and a corresponding one of the outer planetary gears P2out are integrally coupled such that they rotate about a common axis, and the carrier CA1 and the carrier CA2 are integrally coupled. Thus, the automatic transmission 10 includes five rotational elements, that is, first to fifth rotational elements M1 to M5, formed by the sun gear S1, the sun gear S2, the ring gear R1, the ring gear R2, and the coupled carriers CA1, CA2. The first rotational element M1 is formed by the sun gear S1, the second rotational element M2 is formed by the coupled carriers CA1, CA2, the third rotational element M3 is formed by the ring gear R2, the fourth rotational element M4 is formed by the ring gear R1, and the fifth rotational element M5 is formed by the sun gear S2.

The first rotational element M1 (sun gear S1) is selectively connectable via a third brake B3 to a case 20 that corresponds to "non-rotatable portion" in the invention. The second rotational element M2 (carriers CA1, CA2) is selectively connectable to the input shaft 16 via a third clutch C3, and is selectively connectable to the case 20 via a second brake B2 so that the rotation of the second rotational element M2 is stopped by engaging the second brake B2. The third rotational element M3 (ring gear R2) is selectively connectable via a second clutch C2 to the input shaft 16, and is selectively connectable via a first brake B1 to the case 20 so that the rotation of the third rotational element M3 is stopped by engaging the first brake B1. The fourth rotational element M4 (ring gear R1) is integrally coupled with the output gear 18 and outputs rotations therethrough. The fifth rotational element M5 (sun gear S2) is selectively connectable to the input shaft 16 via a first clutch C1. The clutches C1 to C3 and the brakes B1 to B3 are hydraulically-driven friction engagement devices of a multi-plate type, which are each friction-engaged by hydraulic cylinders. An one-way clutch F1 is disposed in parallel with the first brake B1 between the third rotational element M3 and the case 20 so as to allow the third rotational element M3 to rotate in a normal direction (i.e., direction in which the input shaft 16 rotates) and prohibits reverse rotation thereof.

Figure 2:
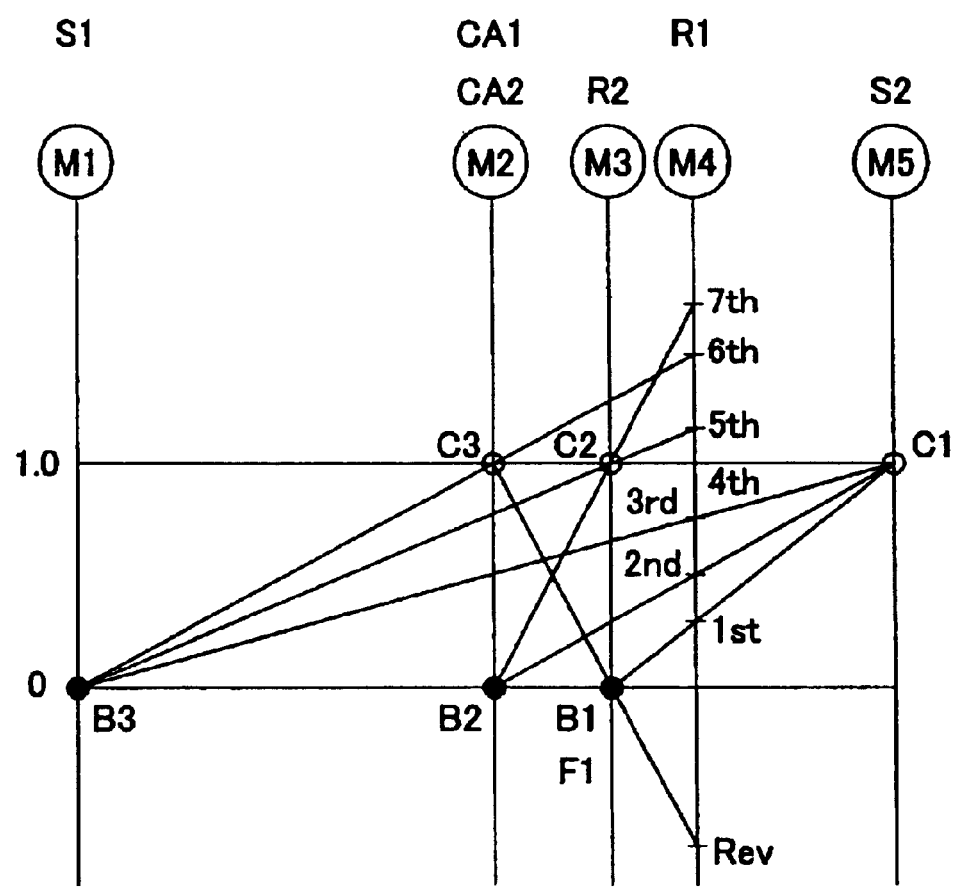
FIG. 2 is an alignment graph in which rotation speeds of rotational elements of the automatic transmission shown in FIG. 1A are indicated by straight lines.

FIG. 2 is an alignment graph in which rotation speeds of the rotational elements M1 to M5 are indicated by straight lines. In this graph, the lower horizontal line represents zero in rotation speed, and the upper horizontal line represents 1 in rotation speed, which is equal to the rotation speed of the input shaft 16. The five vertical lines in the graph represent, sequentially from the left, the first rotational element M1 (sun gear S1), the second rotational element M2 (carriers CA1, CA2), the third rotational element M3 (ring gear R2), the fourth rotational element M4 (ring gear R1), and the fifth rotational element M5 (sun gear S2). The intervals between these vertical lines are determined in accordance with gear ratios $\rho 1$, $\rho 2$ of the planetary gear sets 12, 14.

Referring to FIG. 2, when the fifth rotational element M5 is connected to the first planetary gear set 12 and the rotation of the third rotational element M3 is stopped by engaging the first clutch C1 and the first brake B1, it causes the fourth rotational element M4 coupled with the output gear 18 to rotate at a speed indicated by "1st" in the graph, whereby a first gear speed having the largest transmission gear ratio is established. Note that each transmission gear ratio is determined by "rotation speed of the input shaft 16/rotation speed of the output gear 18", and is therefore equal to an inverse number of the rotation speed of the fourth rotational element M4. When the fifth rotational element M5 is connected to the first planetary gear set 12 and the rotation of the second rotational element M2 is stopped by engaging the first clutch C1 and the second brake B2, it causes the fourth rotational element M4 to rotate at a speed indicated by "2nd" in the graph, whereby a second gear speed having a transmission gear ratio that is smaller than the transmission gear ratio of the first gear speed is established. When the fifth rotational element M5 is connected to the first planetary gear set 12 and the rotation of the first rotational element M1 is stopped by engaging the first clutch C1 and the third brake B3, it causes the fourth rotational element M4 to rotate at a speed indicated by "3rd" in the graph, whereby a third gear speed having a transmission gear ratio that is smaller than the transmission gear ratio of the second gear speed is established. When the first planetary gear set 12 and the second planetary gear set 14 are connected to the input shaft 16 by engaging the first clutch C1 and the second clutch C2, it causes the fourth rotational element M4 to rotate at a speed indicated by "4th" in the graph, whereby a fourth gear speed having a transmission gear ratio that is smaller than the transmission gear ratio of the third gear speed is established. Here, note that the transmission gear ratio of the fourth gear speed is set at 1 in this embodiment. When the third rotational element M3 is connected to the input shaft 16 and the rotation of the first rotational element M1 is stopped by engaging the second clutch C2 and the third brake B3, it causes the fourth rotational element M4 to rotate at a speed indicated by "5th" in the graph, whereby a fifth gear speed having a transmission gear ratio that is smaller than the transmission gear ratio of the fourth gear speed is established. When the second rotational element M2 is connected to the input shaft 16 and the rotation of the first rotational element M1 is stopped by engaging the third clutch C3 and the third brake B3, it causes the fourth rotational element M4 to rotate at a speed indicated by "6th" in the graph, whereby a sixth gear speed having a transmission gear ratio that is smaller than the transmission gear ratio of the fifth gear speed is established. When the third rotational element M3 is connected to the input shaft 16 and the rotation of the second rotational element M2 is stopped by engaging the second clutch C2 and the second brake B2, it causes the fourth rotational element M4 to rotate at a speed indicated by "7th" in the graph, whereby a sixth gear speed having a transmission gear ratio that is smaller than the transmission gear ratio of the sixth gear speed is established.

Also, when the second rotational element M2 is connected to the input shaft 16 and the rotation of the third rotational element M3 is stopped by engaging the third clutch C3 and the first brake B1, it causes the fourth rotational element M4 to rotate in reverse at a speed indicated by "Rev" in the graph, whereby a reverse gear speed is established.

FIG. 1B is an operation table indicating relationships between the gear speeds and actuation of the clutches C1 to C3, and the brakes B1 to B3. In this table, "○" represents "engaged", and "(○)" represents "engaged during engine brake". With the one-way clutch F1 disposed in parallel with the first brake B1, the first brake B1 is not necessarily engaged at the time of starting or accelerating the vehicle. More specifically, the first gear speed can be established by engaging the first clutch C1 only, and shift to the second gear speed can be achieved by subsequently engaging the second brake B2. The transmission gear ratios of the gear speeds are determined in accordance with the gear ratios $\rho 1$, $\rho 2$ of the planetary gear sets 12, 14. For example, transmission gear ratios indicated in FIG. 1B are obtained, where the total transmission gear ratio width is set at a relatively large value of approximately 5.83 (=3.478/0.597), thereby assuring appropriate transmission ratio characteristics as a whole.

In this way, the automatic transmission 10 of the first embodiment achieves the seven gear speeds for forward driving using the two planetary gear sets 12, 14, the three clutches C1 to C3, and the three brakes B1 to B3. Therefore, as compared to the conventional 7-speed automatic transmissions constituted by four planetary gear sets, the automatic transmission 10 can be constructed to be much shorter in its axial length, and thereby to be light in weight and compact in size, which provides advantages of improved installability to vehicles, reduced number of parts, and reduced cost.

Also, even if the planetary gear sets 12, 14 are relatively small in size (i.e., diameter), appropriate transmission gear ratio characteristics, as shown in FIG. 1B, can be obtained as a whole by properly setting their gear ratios ρ1, ρ2.

Next, a second embodiment of the invention will be described in detail.

Figures 3A, 3B:
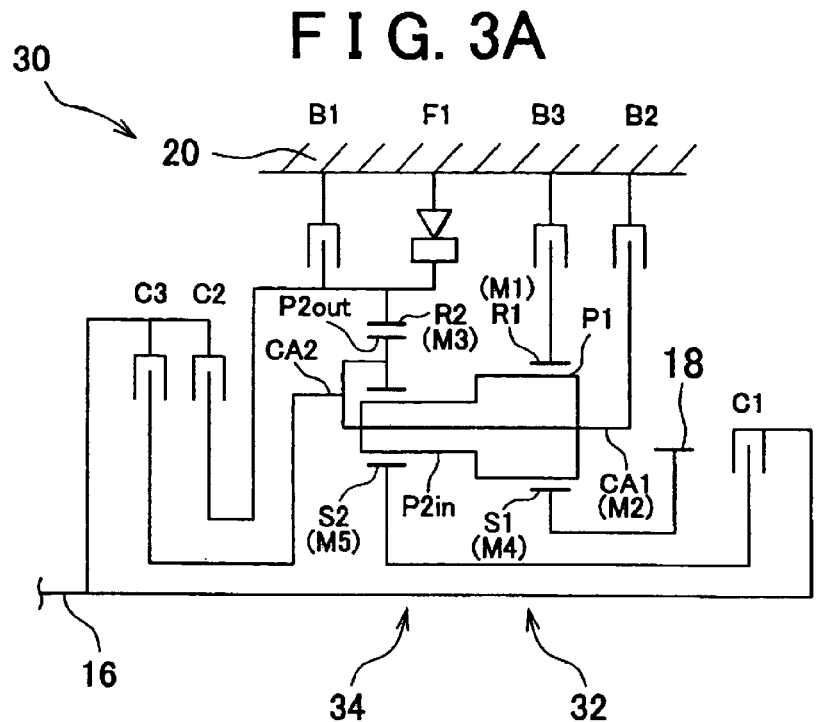
FIG. 3A is a skeleton diagram showing a construction of an automatic transmission for vehicles according to a second embodiment of the invention.
FIG. 3B is an operation table indicating relationships between actuation of engagement devices and gear speeds to be established, and transmission gear ratios achieved at the respective gear speeds.
Figure 4:
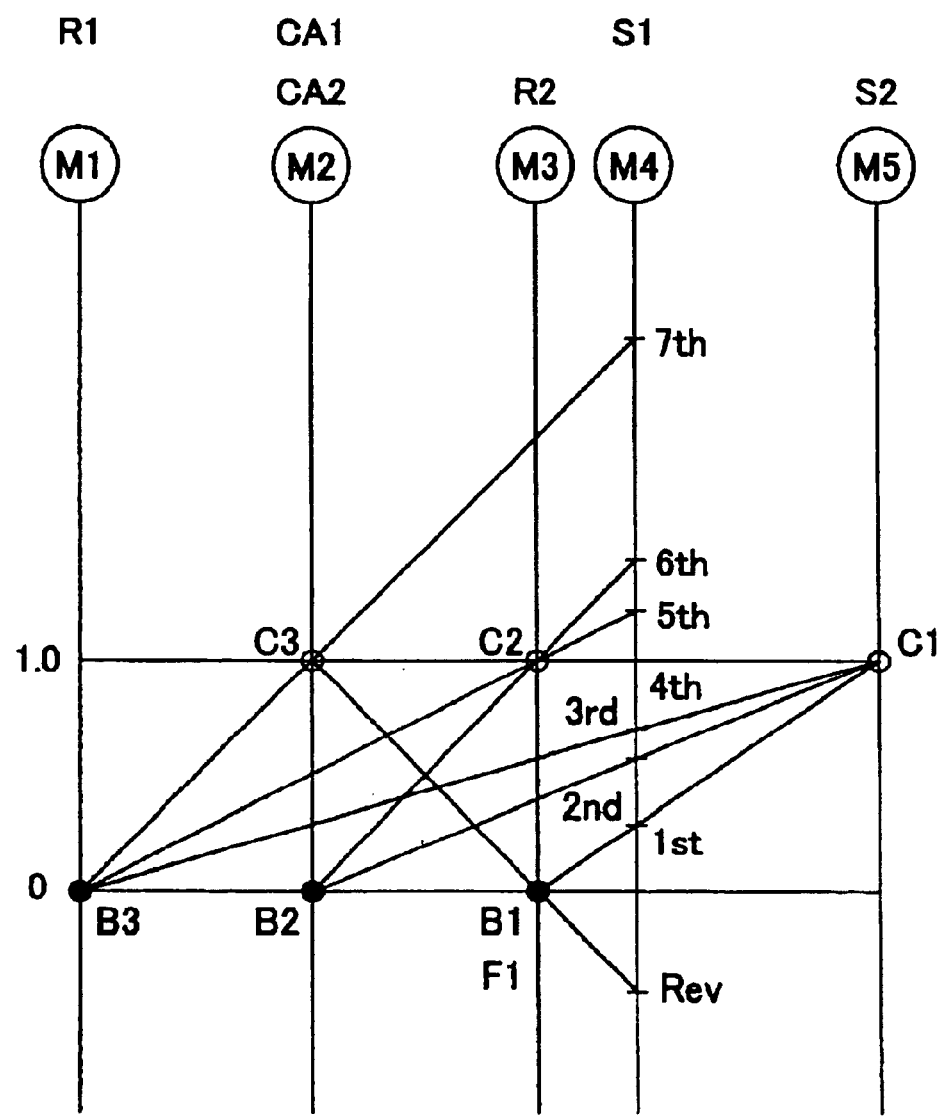
FIG. 4 is an alignment graph in which rotation speeds of rotational elements of the automatic transmission shown in FIG. 3A are indicated by straight lines.

FIG. 3A is a skeleton diagram showing a construction of an automatic transmission 30 according to the second embodiment of the invention. Namely, FIG. 3A corresponds to FIG. 1A for the first embodiment. FIG. 3B is an operation table indicating relationships between actuation of engagement devices and gear speeds, and transmission gear ratios achieved at the respective gear speeds. Namely FIG. 3B corresponds to FIG. 1B for the first embodiment. The automatic transmission 30 includes, as its main components, a first planetary gear set 32 of a single-pinion type and a second planetary gear set 34 of a double-pinion type. The automatic transmission 30 differs from the automatic transmission 10 of the first embodiment in that (i) each planetary gear P1 of the first planetary gear set 32 and a corresponding one of the inner planetary gears P1in of the first planetary gear set 32 are integrally coupled such that they rotate about a common axis, (ii) the first rotational element M1 is formed by the ring gear R1 of the first planetary gear set 32, and is selectively connectable to the case 20 via the third brake B3 so that the rotation of the first rotational element M1 is stopped by engaging the third brake B3, and (iii) the fourth rotational element M4 is formed by the sun gear S1 of the first planetary gear set 32, and is coupled with the output gear 18.

Referring to FIG. 3B, according to the second embodiment, while first to fifth gear speeds are established by actuating the engagement devices in the same manner as the first embodiment, sixth and seventh gear speeds are differently established as follows. That is, when the third rotational element M3 is connected to the input shaft 16 and the rotation of the second rotational element M2 is stopped by engaging the second clutch C2 and the second brake B2, it establishes the sixth gear speed. When the second rotational element M2 is connected to the input shaft 16 and the rotation of the first rotational element M1 is stopped by engaging the third clutch C3 and the third brake B3, it establishes the seventh gear speed. The transmission gear ratios at the gear speeds are determined in accordance with the gear ratios ρ1, ρ2 of the planetary gear sets 32, 34. For example, by setting the gear ratio ρ1 at 0.667 and the gear ratio ρ2 at 0.400, the transmission gear ratios indicated in FIG. 3B are obtained, where the total transmission gear ratio width is set at a relatively large value of 7.50 (=3.000/0.400), thereby assuring appropriate transmission ratio characteristics as a whole.

In this way, the automatic transmission 30 of the second embodiment achieves the seven gear speeds for forward driving using the two planetary gear sets 32, 34, the three clutches C1 to C3, and the three brakes B1 to B3. Therefore, the automatic transmission 30 can be constructed to be much shorter in its axial length, and thereby to be light in weight and compact in size, which provides advantages of improved installability to vehicles, reduced number of parts, and reduced cost. That is, the same advantages as the first embodiment can be obtained.

While the invention has been described in detail with reference to preferred embodiments thereof, it is to be understood that the invention is not limited to the preferred embodiments or constructions. To the contrary, the invention is intended to cover various modifications and equivalent arrangements within the scope of the invention.

What is claimed is:

1. An automatic transmission, comprising:

a first planetary gear set;

a second planetary gear set;

a first clutch;

a second clutch;

a first brake;

a second brake;

a third brake;

a non-rotatable portion;

an input portion for inputting rotations; and an output portion for outputting rotations transmitted from the input portion, wherein a planetary gear of the first planetary gear set and a planetary gear of the second planetary gear set are integrally coupled with each other such that the planetary gears rotate about a common axis;

a carrier of the first planetary gear set and a carrier of the second planetary gear set are integrally coupled with each other; and a sun gear and a ring gear of the first planetary gear set, a sun gear and a ring gear of the second planetary gear set, and the coupled carriers of the first and second planetary gear sets form a first rotational element, a second rotational element, a third rotational element, a fourth rotational element, and a fifth rotational element, and wherein the first rotational element is selectively connectable to the non-rotatable portion via the third brake so that rotation of the first rotational element is stopped by engaging the third brake;

the second rotational element is selectively connectable to the non-rotatable portion via the second brake so that rotation of the second rotational element is stopped by engaging the second brake;

the third rotational element is selectively connectable to the input portion via the second clutch and is selectively connectable to the non-rotatable portion via the first brake so that rotation of the third rotational element is stopped by engaging the first brake;

the fourth rotational element is coupled with the output portion; and the fifth rotational element is selectively connectable to the input portion via the first clutch, and wherein engagement of the first clutch and the first brake establishes a first gear speed having a largest transmission gear ratio;

engagement of the first clutch and the second brake establishes a second gear speed having a transmission gear ratio smaller than the transmission gear ratio of the first gear speed;

engagement of the first clutch and the third brake establishes a third gear speed having a transmission gear ratio smaller than the transmission gear ratio of the second gear speed;

engagement of the first clutch and the second clutch establishes a fourth gear speed having a transmission gear ratio smaller than the transmission gear ratio of the third gear speed; and engagement of the second clutch and the third brake establishes a fifth gear speed having a transmission gear ratio smaller than the transmission gear ratio of the fourth gear speed.

2. The automatic transmission according to claim 1, wherein the first planetary gear set is of a single-pinion type;

the second planetary gear set is of a double-pinion type;

the planetary gear of the first planetary gear set and an outer planetary gear of the second planetary gear set are integrally coupled with each other;

the first rotational element is formed by the sun gear of the first planetary gear set;

the second rotational element is formed by the carrier of the first planetary gear set and the carrier of the second planetary gear set;

the third rotational element is formed by the ring gear of the second planetary gear set;

the fourth rotational element is formed by the ring gear of the first planetary gear set; and the fifth rotational element is formed by the sun gear of the second planetary gear set.

3. The automatic transmission according to claim 1, wherein the first planetary gear set is of a single-pinion type;

the second planetary gear set is of a double-pinion type;

the planetary gear of the first planetary gear set and an inner planetary gear of the second planetary gear set are integrally coupled with each other;

the first rotational element is formed by the ring gear of the first planetary gear set;

the second rotational element is formed by the carrier of the first planetary gear set and the carrier of the second planetary gear set;

the third rotational element is formed by the ring gear of the second planetary gear set;

the fourth rotational element is formed by the sun gear of the first planetary gear set; and the fifth rotational element is formed by the sun gear of the second planetary gear set.

4. An automatic transmission, comprising:

a first planetary gear set;

a second planetary gear set;

a first clutch;

a second clutch;

a third clutch;

a first brake;

a second brake;

a third brake;

a non-rotatable portion;

an input portion for inputting rotations; and an output portion for outputting rotations transmitted from the input portion, wherein a planetary gear of the first planetary gear set and a planetary gear of the second planetary gear set are integrally coupled with each other such that the planetary gears rotate about a common axis;

a carrier of the first planetary gear set and a carrier of the second planetary gear set are integrally coupled with each other; and a sun gear and a ring gear of the first planetary gear set, a sun gear and a ring gear of the second planetary gear set, and the coupled carriers of the first and second planetary gear sets form a first rotational element, a second rotational element, a third rotational element, a fourth rotational element, and a fifth rotational element, and wherein the first rotational element is selectively connectable to the non-rotatable portion via the third brake so that rotation of the first rotational element is stopped by engaging the third brake;

the second rotational element is selectively connectable to the input portion via the third clutch and is selectively connectable to the non-rotatable portion via the second brake so that rotation of the second rotational element is stopped by engaging the second brake;

the third rotational element is selectively connectable to the input portion via the second clutch and is selectively connectable to the non-rotatable portion via the first brake so that rotation of the third rotational element is stopped by engaging the first brake;

the fourth rotational element is coupled with the output portion; and the fifth rotational element is selectively connectable to the input portion via the first clutch, and wherein engagement of the first clutch and the first brake establishes a first gear speed having a largest transmission gear ratio;

engagement of the first clutch and the second brake establishes a second gear speed having a transmission gear ratio smaller than the transmission gear ratio of the first gear speed;

engagement of the first clutch and the third brake establishes a third gear speed having a transmission gear ratio smaller than the transmission gear ratio of the second gear speed;

engagement of selected two of the first clutch, the second clutch, and the third clutch establishes a fourth gear speed having a transmission gear ratio smaller than the transmission gear ratio of the third gear speed; and engagement of the second clutch and the third brake establishes a fifth gear speed having a transmission gear ratio smaller than the transmission gear ratio of the fourth gear speed;

engagement of the third clutch and the third brake establishes a sixth gear speed having a transmission gear ratio smaller than the transmission gear ratio of the fifth gear speed; and engagement of the second clutch and the second brake establishes a seventh gear speed having a transmission gear ratio smaller than the transmission gear ratio of the sixth gear speed.

5. The automatic transmission according to claim 4, wherein the first planetary gear set is of a single-pinion type;

the second planetary gear set is of a double-pinion type;

the planetary gear of the first planetary gear set and an outer planetary gear of the second planetary gear set are integrally coupled with each other;

the first rotational element is formed by the sun gear of the first planetary gear set;

the second rotational element is formed by the carrier of the first planetary gear set and the carrier of the second planetary gear set;

the third rotational element is formed by the ring gear of the second planetary gear set;

the fourth rotational element is formed by the ring gear of the first planetary gear set; and the fifth rotational element is formed by the sun gear of the second planetary gear set.

6. An automatic transmission, comprising:

a first planetary gear set;

a second planetary gear set;

a first clutch;

a second clutch;

a third clutch;

a first brake;

a second brake;

a third brake;

a non-rotatable portion;

an input portion for inputting rotations; and an output portion for outputting rotations transmitted from the input portion, wherein a planetary gear of the first planetary gear set and a planetary gear of the second planetary gear set are integrally coupled with each other such that the planetary gears rotate about a common axis;

a carrier of the first planetary gear set and a carrier of the second planetary gear set are integrally coupled with each other; and a sun gear and a ring gear of the first planetary gear set, a sun gear and a ring gear of the second planetary gear set, and the coupled carriers of the first and second planetary gear sets form a first rotational element, a second rotational element, a third rotational element, a fourth rotational element, and a fifth rotational element, and wherein the first rotational element is selectively connectable to the non-rotatable portion via the third brake so that rotation of the first rotational element is stopped by engaging the third brake;

the second rotational element is selectively connectable to the input portion via the third clutch and is selectively connectable to the non-rotatable portion via the second brake so that rotation of the second rotational element is stopped by engaging the second brake;

the third rotational element is selectively connectable to the input portion via the second clutch and is selectively connectable to the non-rotatable portion via the first brake so that rotation of the third rotational element is stopped by engaging the first brake;

the fourth rotational element is coupled with the output portion; and the fifth rotational element is selectively connectable to the input portion via the first clutch, and wherein engagement of the first clutch and the first brake establishes a first gear speed having a largest transmission gear ratio;

engagement of the first clutch and the second brake establishes a second gear speed having a transmission gear ratio smaller than the transmission gear ratio of the first gear speed;

engagement of the first clutch and the third brake establishes a third gear speed having a transmission gear ratio smaller than the transmission gear ratio of the second gear speed;

engagement of selected two of the first clutch, the second clutch, and the third clutch establishes a fourth gear speed having a transmission gear ratio smaller than the transmission gear ratio of the third gear speed;

engagement of the second clutch and the third brake establishes a fifth gear speed having a transmission gear ratio smaller than the transmission gear ratio of the fourth gear speed;

engagement of the second clutch and the second brake establishes a sixth gear speed having a transmission gear ratio smaller than the transmission gear ratio of the fifth gear speed; and engagement of the third clutch and the third brake establishes a seventh gear speed having a transmission gear ratio smaller than the transmission gear ratio of the sixth gear speed.

7. The automatic transmission according to claim 6, wherein the first planetary gear set is of a single-pinion type;

the second planetary gear set is of a double-pinion type;

the planetary gear of the first planetary gear set and an inner planetary gear of the second planetary gear set are integrally coupled with each other;

the first rotational element is formed by the ring gear of the first planetary gear set;

the second rotational element is formed by the carrier of the first planetary gear set and the carrier of the second planetary gear set;

the third rotational element is formed by the ring gear of the second planetary gear set;

the fourth rotational element is formed by the sun gear of the first planetary gear set; and the fifth rotational element is formed by the sun gear of the second planetary gear set.

* * * * *